United States Patent [19]

Kondo et al.

[11] Patent Number: 5,229,949

[45] Date of Patent: Jul. 20, 1993

[54] SEWING MANAGEMENT SYSTEM FOR A PLURALITY OF SEWING MACHINES

[75] Inventors: Ikuzo Kondo, Chita; Yoshiharu Higuchi, Yokkaichi; Tomoyuki Fujita, Tajimi, all of Japan

[73] Assignee: Brother Kogyo Kabushiki Kaisha, Nagoya, Japan

[21] Appl. No.: 691,374

[22] Filed: Apr. 25, 1991

[30] Foreign Application Priority Data

May 9, 1990 [JP] Japan .................. 2-119407

[51] Int. Cl.[5] .............. G06F 15/46; D05R 21/00
[52] U.S. Cl. .................. 364/470; 112/121.12
[58] Field of Search .......... 364/470, 131, 133, 138; 112/121.11, 121.12

[56] References Cited

U.S. PATENT DOCUMENTS

| | | | |
|---|---|---|---|
| 4,369,722 | 1/1983 | Nishida et al. | 112/121.12 |
| 4,408,291 | 10/1983 | Gunzberg et al. | 364/138 |
| 4,899,287 | 2/1990 | Hülshoff et al. | 364/470 |
| 4,932,342 | 6/1990 | Hisatake et al. | 112/103 |
| 4,936,232 | 6/1990 | Monma | 112/103 |
| 4,955,305 | 9/1990 | Garnier et al. | 112/121.11 |
| 5,003,897 | 4/1991 | Yokoe et al. | 112/121.12 |

FOREIGN PATENT DOCUMENTS

62-4149  1/1987  Japan .

Primary Examiner—Jerry Smith
Assistant Examiner—Paul Gordon
Attorney, Agent, or Firm—Oliff & Berridge

[57] ABSTRACT

A sewing system includes a plurality of sewing machines and a managing apparatus for managing sewing operations of the sewing machines. The managing apparatus determines a type of a work to be sewn by each of the sewing machines and sewing steps for such work, and supplies an identification code thereof to the sewing machines. A controller of the sewing machine reads out sewing data corresponding to the identification code from sewing data storage, and controls the sewing machine in accordance with the sewing data.

15 Claims, 9 Drawing Sheets

| SEWING DATA MEMORY —240 | |
|---|---|
| 01 | WORK CODE |
| 01 | SEWING STEP CODE |
| 50 | FABRIC PRESSING PRESSURE (×0.1kg) |
| 01 | } THREAD TIGHTNESS DEGREE (g) |
| 20 | |
| 22 | STITCH PITCH (×0.1mm) |
| 01 | PRESSER FOOT No. |
| 40 | MAXIMUX SEWING SPEED (×100rpm) |
| 02 | SEWING STEP CODE |
| 70 | FABRIC PRESSING PRESSURE (×0.1kg) |

//

SEWING MANAGEMENT SYSTEM FOR A PLURALITY OF SEWING MACHINES

BACKGROUND OF THE INVENTION

Field of the Invention

This invention relates to a sewing system including a plurality of sewing machines and a management apparatus for managing sewing operations of such sewing machines, and more particularly to a sewing management system for a plurality of sewing machines each of which includes a storage device in which a plurality of sewing data are stored.

Description of Related Art

When sewing operations are performed using a plurality of sewing machines, sewing conditions are normally different depending upon the types of works to be sewn. When only one work is to be sewn that is composed of a plurality of components, e.g., a shirt composed of a collar, a pair of sleeves and a body, it is sometimes necessary to change the sewing conditions depending upon the component being sewn. Such sewing conditions may include, for example, a feed pitch of a work to be sewn, a pressure of a presser member for pressing down a work to be sewn, a type of such presser member, a degree of tightness of a needle thread and a sewing speed. Conventionally, the setting of such sewing conditions is performed by an operator.

It is, however, cumbersome for an operator to set such sewing conditions, and much skill is required for an operator to effect the appropriate setting. Further, if settings vary among different operators, then works will be non-uniform in quality. If a working table is produced to specify settings, then works will be uniform in quality, but when works of many types are to be sewn in small quantities, a great number of adjusting operations are required. Accordingly, deterioration in working efficiency is not eliminated.

SUMMARY OF THE PRESENT INVENTION

It is an object of the present invention to provide a sewing system which can automatically set sewing conditions for a plurality of sewing machines in response to an instruction from a managing apparatus.

It is a further object of the present invention to provide a sewing system wherein each of a plurality of sewing machines has a storage device in which plural sewing data are stored and can be transferred efficiently from a managing apparatus to the sewing machines.

In order to attain the objects, according to the present invention, there is provided a sewing management system which includes a plurality of sewing machines and a managing apparatus for managing sewing operations of the sewing machines, wherein the managing apparatus includes sewing step instructing means for instructing at least one of a plurality of the sewing steps, and identification code supplying means for supplying an identification code representative of a sewing step instructed by the sewing step instructing means to the sewing machines, and each of the sewing machines includes sewing data storage means for storing therein a plurality of sewing data necessary for execution of each of sewing steps in a corresponding relationship to the identification codes, and controlling means for reading out sewing data for a sewing step represented by an identification code supplied from the identification code supplying means from the sewing data storage means and controlling the sewing machine in accordance with the thus read sewing data.

It is to be noted here that a "sewing step" denotes a step at which sewing can be performed without changing sewing conditions and may sew an entire work, or a component of a work or a part of a component of a work. Accordingly, "a plurality of sewing steps" may be a plurality of sewing steps involved in sewing of a work or sewing steps set for different works.

With the sewing managing system for a plurality of sewing machines having such construction as described above, if a sewing step is instructed by the sewing step instructing means of the managing apparatus, then an identification code representative of the sewing step is supplied to a sewing machine. The controlling means of the sewing machine reads out sewing data corresponding to the thus supplied identification code from the sewing data storage means, and controls a sewing condition setting device provided for the sewing machine to set sewing conditions to the magnitudes and types set by the sewing data.

In this manner, in the sewing management system for sewing machines of the present embodiment, since sewing conditions are automatically set to conditions suitable for performance of a sewing step, the operation efficiency is improved compared with an alternative case wherein an operator sets such sewing conditions. In addition, uniform sewn works are obtained.

Further, since a sewing step is indicated by an identification code, sewing data need not be stored for each sewing step as in an alternative case wherein the managing apparatus supplies sewing data themselves to the sewing machines. Consequently, the capacity of a storage device of the managing apparatus can be reduced. Particularly where each of the sewing machines is a dedicated sewing machine for performing only one kind or a small number of kinds of sewing operations, since the managing apparatus manages a plurality of sewing machines, when sewing data are to be stored, the managing apparatus must store therein data necessary for the sewing operations to be performed on all of the sewing machines. However, according to the sewing management system for sewing machines of the present invention, the sewing data storage means of each of the sewing machines must only store therein sewing data for performing the dedicated sewing operation or operations, and accordingly, the storage capacity thereof can be minimized.

Further, different sewing machines normally differ in working and assembly, and even when the same step is to be performed for the same work on the sewing machines, the data for the sewing machines may require individual modification. Also in this instance, the individual setting of data for each sewing machine can be readily performed because each of the sewing machines has sewing data therefor stored therein.

Since the managing apparatus performs only the designation of steps and detailed sewing data are provided in each of the sewing machines, such designation and setting of data to the sewing machines can be effected independently of each other. Accordingly, a system designer can build a system even without familiarity of a particular sewing machine.

BRIEF DESCRIPTION OF THE DRAWINGS

A preferred embodiment of the present invention will be described in detail with reference to the following figures wherein.

DESCRIPTION OF THE PREFERRED EMBODIMENTS

Figure 1A:
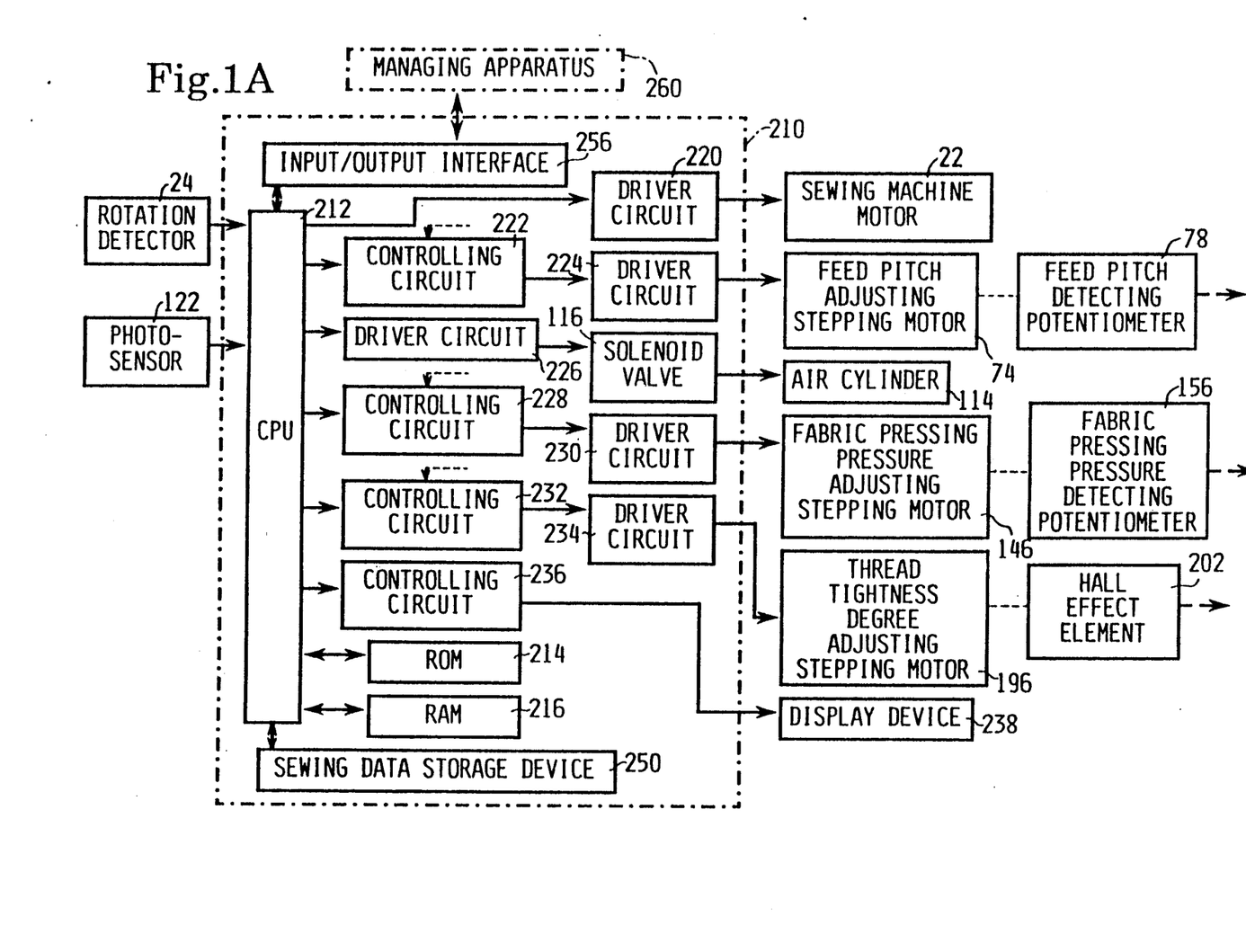
FIG. 1A is a block diagram showing a managing apparatus for sewing machines and a controlling apparatus of a sewing machine according to an embodiment of the present invention.
Figure 2:
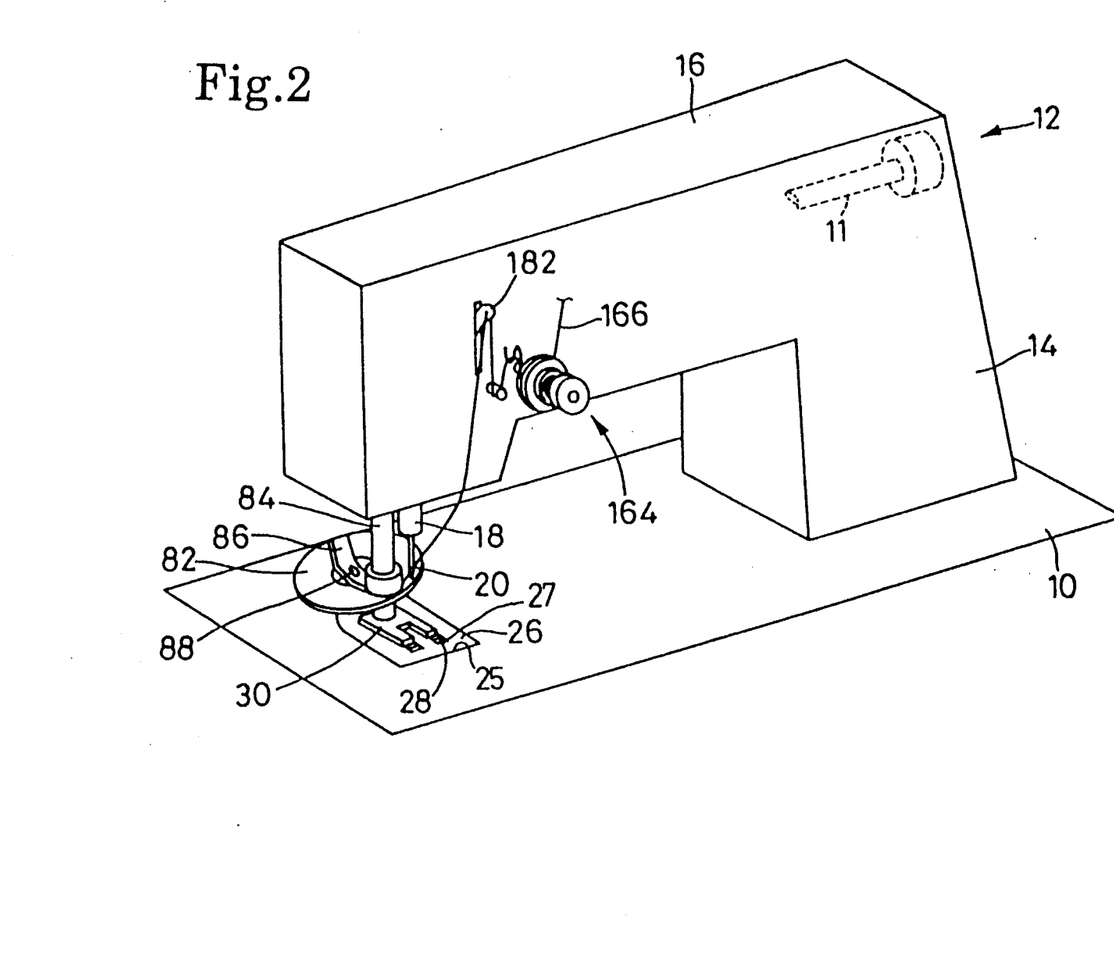
FIG. 2 is a perspective view showing a head of the sewing machine.

Referring to FIG. 2, a sewing machine frame 12 is provided on a bed 10 of a sewing machine. The sewing machine frame 12 has a column portion 14 extending vertically upwardly from the bed 10 and an upper arm 16 extending in parallel to the bed 10 from an upper end of the column portion 14 like a cantilever. A needle bar 18 is mounted for up and down movement on the sewing machine frame 12 by means of a needle bar base (not shown), and a sewing needle 20 is secured to a lower end portion of the needle bar 18. The needle bar 18 and sewing needle 20 are moved up and down when a sewing machine main shaft 11 is rotated. Rotation of the sewing machine main shaft 11 is detected by a rotation detector 24 shown in FIG. 1A. The rotation detector 24 generates a pulse signal in response to rotation of the sewing machine main shaft 11.

An opening 25 is formed in an upper wall of the bed 10 and closed with a throat plate 26. A slot 27 is formed in the throat plate 26 so that a feed dog 28 may be projected upwardly therethrough. A feeding movement is imparted to the feed dog 28 from a sewing machine motor 22 in a synchronized relationship with up and down motion of the sewing needle 20. The feed dog 28 cooperates with a presser foot 30 to feed a work fabric in a forward or backward direction. The feed pitch of the feed dog 28 is adjusted by a pitch adjusting device 32 shown in FIG. 3. The adjusting principle of the feed pitch adjusting device 32 is similar to that of the feed pitch adjusting device disclosed in Japanese Utility Model Laid-Open Publication No. 61-160874 and is described as follows.

Figure 3:
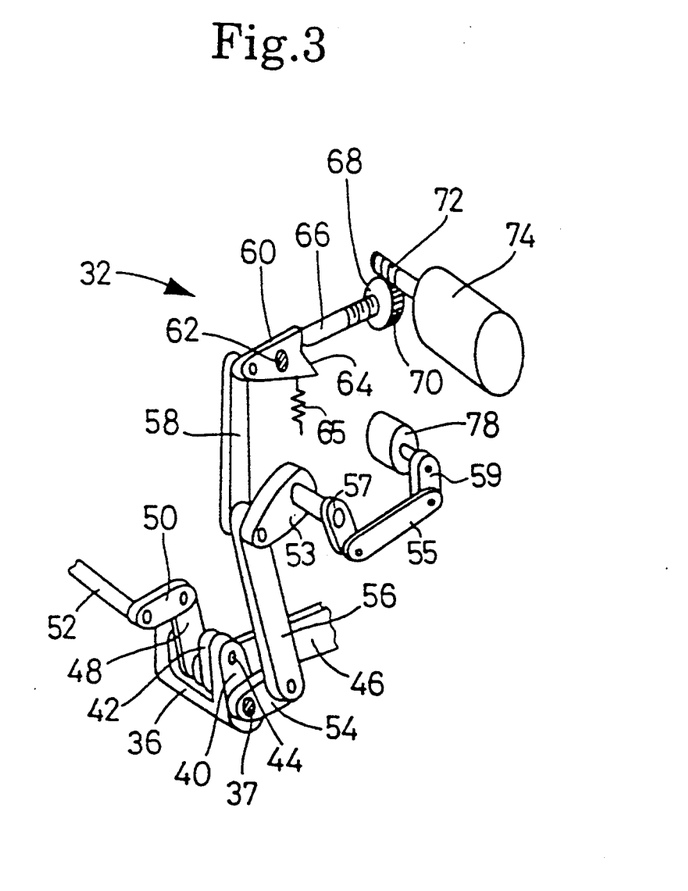
FIG. 3 is a perspective view showing a feed pitch adjusting device of the sewing machine.

Referring to FIG. 3, in the feed pitch adjusting device 32 shown, a feeding change-over member 36 in the form of a yoke is mounted for pivotal motion on a sewing machine frame member by way of a support shaft 37. The feeding change-over member 36 has an arm portion 40 on which a pivotal arm 42 is mounted at an end portion thereof for pivotal motion by means of a support shaft 44. A crank rod 46 is connected at an end portion thereof for pivotal motion to the other end portion of the pivotal arm 42. The other end portion of the crank rod 46 is moved back and forth in a longitudinal direction in response to rotation of the sewing machine main shaft 11. A link 48 is connected for pivotal motion to the crank rod 46 together with the pivotal arm 42, and another link 50 is connected to the link 48 and secured to a horizontal feed shaft 52. The horizontal feed shaft 52 is operatively connected to the feed dog 28 such that, when the crank rod 46 is moved back and forth in response to rotation of the sewing machine main shaft 11, the horizontal feed shaft 52 is moved back and forth to transmit horizontal back and forth motion to the feed dog 28.

A lever 54 is further secured to the arm 40 of the feeding change-over member 36 and connected to a feed pitch adjusting member 60 by way of a link 58. The feed pitch adjusting member 60 is supported for pivotal motion on a sewing machine frame member by means of a shaft 62. The feed pitch adjusting member 60 is normally urged in the clockwise direction in FIG. 3 by a spring 65 so that it is normally held in a condition where it contacts a feed screw 66 at a recess 64 of the feed pitch adjusting member 60. The feed screw 66 is supported for axial movement in, but is prevented from relative rotation with respect to the sewing machine frame member, and is screwed in a nut 68. The nut 68 is held in meshing engagement at a gear 70 formed on an outer periphery thereof with a worm wheel 72. When the worm wheel 72 is rotated by a feed pitch adjusting stepping motor 74, the feed screw 66 is moved in an axial direction to pivot the feed pitch adjusting member 60. Upon such pivotal motion of the adjusting member 60, the feeding change-over member 36 is pivoted around the support shaft 37 to change the position of the support shaft 44. Consequently, the range of back and forth angular rotation of the horizontal feed shaft 52 is changed, to thereby change the work feeding amount (feed pitch) of the feed dog 28. It is to be noted that a feed pitch detecting potentiometer 78 is connected to the link 56 by way of a plurality of levers 57 and 59 and links 53 and 55, and detects an amount of pivotal motion of the link 56 to detect the magnitude of the feed pitch.

Figure 4:
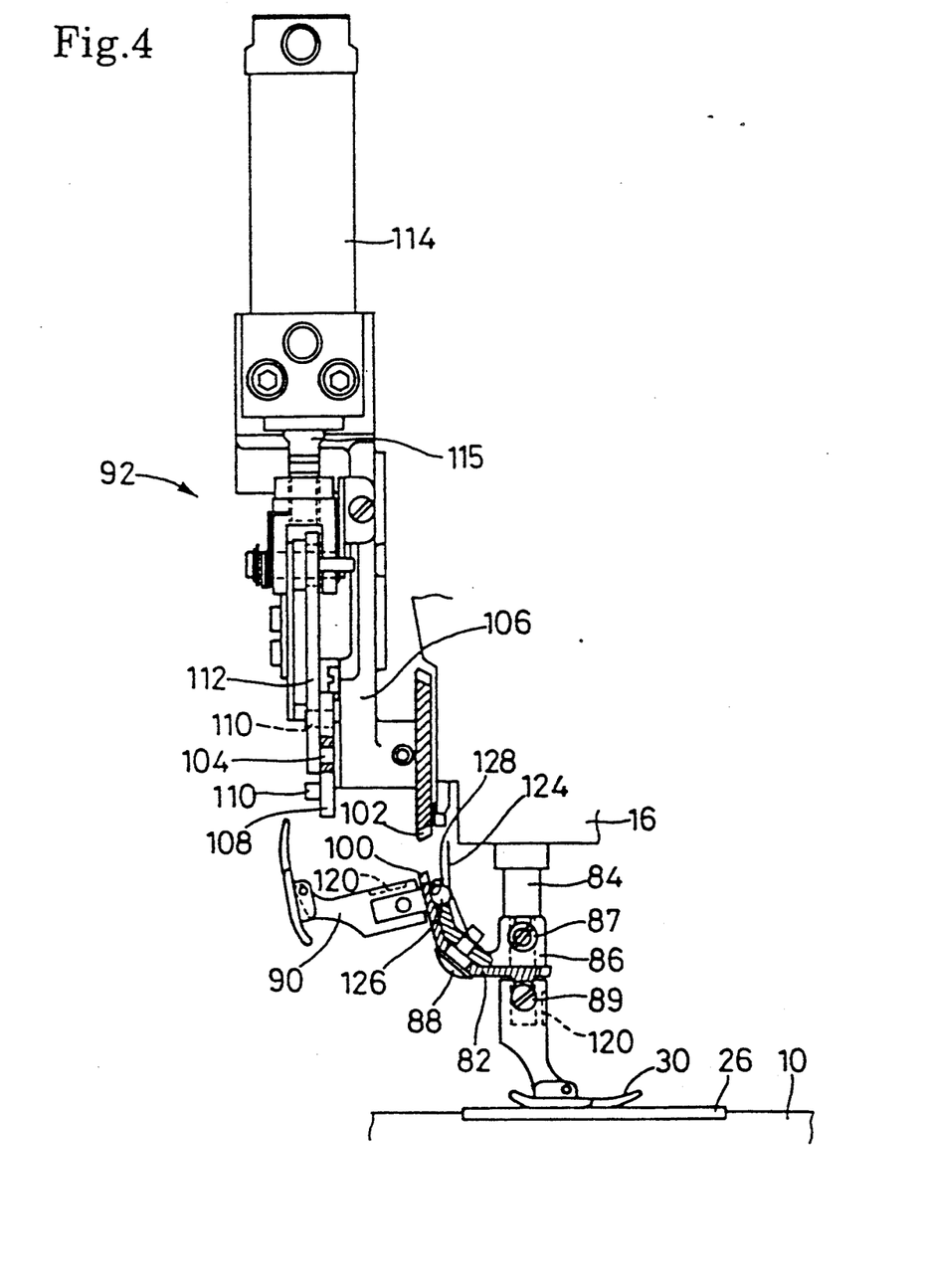
FIG. 4 is a front elevational view showing a presser foot exchanging device.

Referring now to FIGS. 2 and 4, the presser foot 30 is held on a holder member 82. A presser bar 84 is mounted for movement in a vertical direction on the sewing machine frame 12, and a bracket 86 is removably secured to a lower end portion of the presser bar 84 by means of a fastening screw 87. The holder member 82 is mounted for rotation on the bracket 86 by means of a pin 88. The presser foot 30 and two presser feet 90 (only one of such presser feet 90 is shown in FIG. 4) of different types than the presser foot 30 are removably secured in an angularly equidistantly spaced relationship from each other on the holder member 82 each by means of a fastening screw 89. The presser feet 30 and 90 of the three different types are alternatively positioned in an operative position below a presser bar 84 when the holder member 82 is rotated by one third rotation by a presser foot exchanging device 92 shown in FIG. 4.

The presser foot exchanging device 92 is similar to the exchanging device disclosed in the specification and the drawings annexed to the application of Japanese Patent Application No. 2-114345 and is described as follows.

A gear 100 is formed on an outer peripheral edge of the holder member 82 and is brought into meshing engagement with another gear 102 when the presser bar 84 is moved up. A shaft 104 on which the gear 102 is supported is supported for rotation on a frame 106 secured to the upper arm 16. A rotary plate 108 is secured to the other end of the shaft 104. Six pins 110 are provided to extend from the rotary plate 108 for engaging with a driving member 112. The driving member 112 is mounted for rotation on a piston rod 115 of an air cylinder 114 and is moved up or down as the piston rod 115 is expanded or contracted by changing over of a solenoid valve 116 shown in FIG. 1. Two pawls are formed on the driving member 112 such that, when the driving member 112 is moved up, the pawls are successively engaged with two adjacent ones of the pins 110, but when the driving member 112 is moved down, the pawls are disengaged from the two pins 110. Each time the driving member 112 is moved up and down, the rotary plate 108 is rotated by 120 degrees to move the presser feet 30 and 90 successively to the operative position. It is to be noted that a reflecting plate 120 is mounted on each of the three presser feet 30 and 90. Light emitted from a light emitting portion of a photo-sensor 122 provided on the frame 106 shown in FIG. 1A is reflected by the reflecting plates 120 and received by a receiving portion of the photo-sensor 122. The reflecting plates 120 of the presser feet 30 and 90 reflect different amounts of light so that a type of one of the presser feet 30 and 90 positioned at the operative position may be discriminated from the reflected light. Meanwhile, the holder member 82 is positioned with respect to the bracket 86 as a ball 126 which is held by the bracket 86. Holder member 82 is normally urged by a spring 124 fitted into a groove 128.

Figure 5:
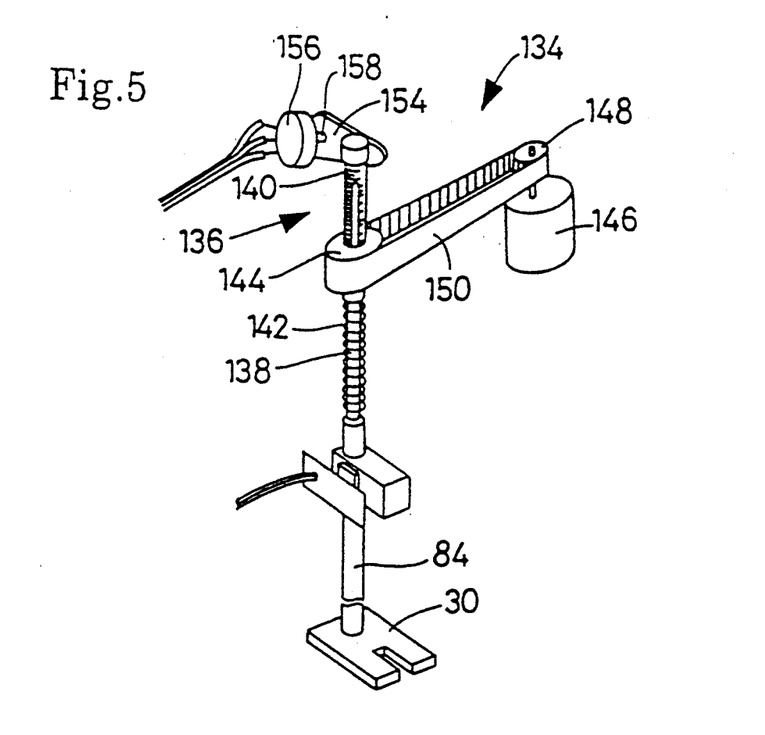
FIG. 5 is a perspective view showing a fabric pressing pressure adjusting device of the sewing machine.

The pressure under which the presser foot 30 or 90 presses a work fabric is adjusted by a fabric pressing pressure adjusting device 134 shown in FIG. 5. It is to be noted that only the presser foot 30 is shown as a representative in FIG. 5. Referring to FIG. 5, the presser bar 84 on which the presser foot 30 is mounted has a cylindrical profile, and a screw shaft 136 is fitted, at a shaft portion 138 thereof, for axial movement, but is prevented from rotation relative to the presser bar 84. The presser bar 84 is normally urged downwardly by a compression spring 142 disposed between the presser bar 84 and a threaded portion 140. The threaded portion 140 is screwed in a female thread formed on an inner periphery of a timing pulley 144. The timing pulley 144 is connected by way of a timing belt 150 to another timing pulley 148 connected to be rotated by a fabric pressing pressure adjusting stepping motor 146. When the timing pulley 144 is rotated, the screw shaft 136 is moved in an axial direction thereof to change the compression amount of the compression spring 142, thereby changing the fabric pressing pressure which is applied from the presser bar 84 to the presser foot 30. A lever 154 is engaged with an upper end portion of the screw shaft 136. The lever 154 is secured to a rotary shaft 158 of a fabric pressing pressure detecting potentiometer 156. Accordingly, when the screw shaft 136 is moved to adjust the fabric pressing pressure, the lever 154 is pivoted, and such pressure can be detected by detecting an angle of pivotal motion of the lever 154.

Figure 6:
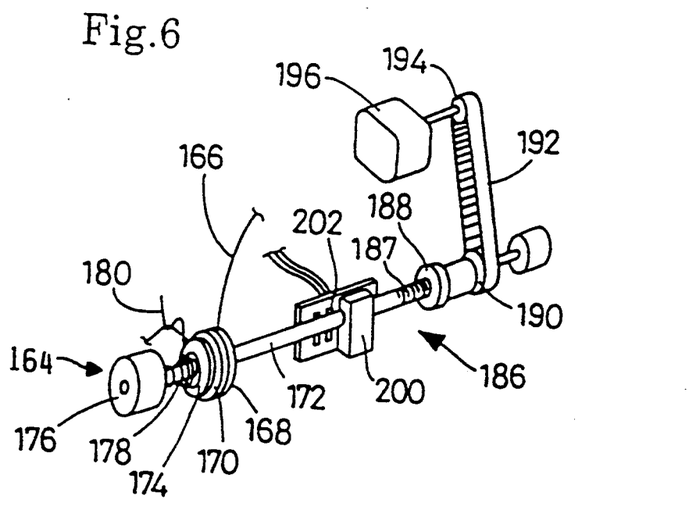
FIG. 6 is a perspective view showing a thread tightness degree adjusting device.

Referring to FIG. 2, a tension adjuster 164 is provided on the sewing machine frame 12 to apply tension to a needle thread 166 to tighten stitches. Referring now to FIG. 6, the tension adjuster 164 includes two tension discs 168 and 170. The tension discs 168 and 170 are fitted for relative axial movement at an end portion of a shaft 172. The tension discs 168 and 170 are normally urged by a tension spring 178 disposed between a tension releasing disc 174 and a tension knob 176 so that they are pressed against a tension disc supporting member (not shown) secured to the upper arm 16 to apply tension to the needle thread 166 passing between the tension discs 168 and 170. The needle thread 166 passing between the tension discs 168 and 170 is guided by a thread take-up spring 180 and then by a thread take-up lever 182 shown in FIG. 2, and is then threaded through the sewing needle 20. The magnitude of tension applied to the needle thread 166 by the tension adjuster 164 is adjusted by a thread tightness degree adjusting device 186.

The shaft 172 on which the tension discs 168 and 170 are supported is supported for axial relative movement, but is prevented from relative rotation on the upper arm 16. A threaded portion 187 is formed at the other end portion of the shaft 172 and screwed in a nut 188. A timing pulley 190 is secured to the nut 188. The timing pulley 190 is connected to a timing pulley 194 by way of another timing belt 192. The timing pulley 194 is rotated by a thread tightness degree adjusting stepping motor 196 to move the shaft 172 in an axial direction. If the distance between the tension releasing disc 174 and the tension knob 176 is increased, then the urging force of the tension spring 178 is decreased, thereby reducing the thread tightness degree. In contrast, if the distance between the tension releasing disc 174 and the tension knob 176 is decreased, then the thread tightness degree is increased. A magnet 200 is secured to an intermediate portion of the shaft 172 while a Hall effect element 202 is provided in an opposing relationship to the magnet 200. Accordingly, if the shaft 172 is moved, then the voltage generated by the Hall effect element 202 is changed, and the adjusted amount of the thread tightness degree can be detected from such change of the voltage.

Referring to FIG. 1A, the sewing machine includes a controlling apparatus 210 serving as controlling means. The controlling apparatus 210 includes as a main component thereof a microcomputer wherein a ROM (read only memory) 214 and a RAM (random access memory) 216 are connected to a CPU (central processing unit) 212 by way of a bus. The sewing machine motor 22 is connected to the CPU 212 by way of a driver circuit 220. The feed pitch adjusting stepping motor 74 is connected to the CPU 212 by way of a controlling circuit 222 and a driver circuit 224. The solenoid valve 116 is connected to the CPU 212 by way of a driver circuit 226. The fabric pressing pressure adjusting stepping motor 146 is connected to the CPU 212 by way of a controlling circuit 228 and a driver circuit 230. The thread tightness degree adjusting stepping motor 196 is connected to the CPU 212 by way of a controlling circuit 232 and a driver circuit 234, and a display device 238 is connected to the CPU 212 by way of a controlling circuit 236.

Detection values of the feed pitch detecting potentiometer 78, fabric pressing pressure detecting potentiometer 156 and Hall effect element 202 are supplied to the controlling circuits 222, 228 and 232, respectively. The controlling circuits 222, 228 and 232 calculate, in accordance with such detection values and instruction values supplied from the CPU 212, driving voltages for the feed pitch adjusting stepping motor 74, fabric pressing pressure adjusting stepping motor 146 and thread tightness degree adjusting stepping motor 196. Controlling circuits 222, 228 and 232 output the thus calculated driving voltages to the driver circuits 224, 230 and 234, respectively. Consequently, the feed pitch, fabric pressing pressure and thread tightness degree are adjusted to the magnitudes instructed by the CPU 212. It is to be noted that detection values of the rotation detector 24 and the photo-sensor 122 are supplied to the CPU 212, and the CPU 212 calculates a driving voltage for the sewing machine motor 22 and controls the sewing speed. The CPU 212 detects a presser foot at the operative position in response to a detection signal from the photo-sensor 122, and operates the air cylinder 114 so that a required one of the presser feet 30 and 90 may be positioned in the operative position.

Figure 7:
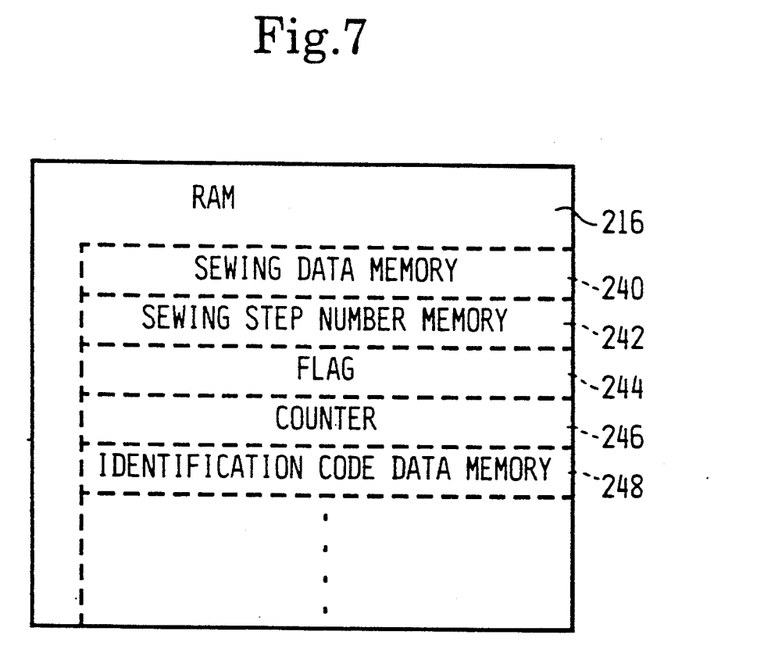
FIG. 7 is a view showing storage sections in a RAM of a computer which is a main component of the controlling apparatus.

Referring now to FIG. 7, the RAM 216 has a sewing data memory 240, a sewing step number memory 242, a flag 244, a counter 246 and an identification code data memory 248 provided therein together with a working memory. The ROM 214 has stored therein, in addition to a sewing condition setting routine illustrated in a flow chart of FIG. 8, various routines necessary for sewing including a sewing step completion detecting routine for detecting completion of a sewing step from a number of thread cutting operations performed by an automatic thread cutting device, and a sewing speed controlling routine.

Figure 9:
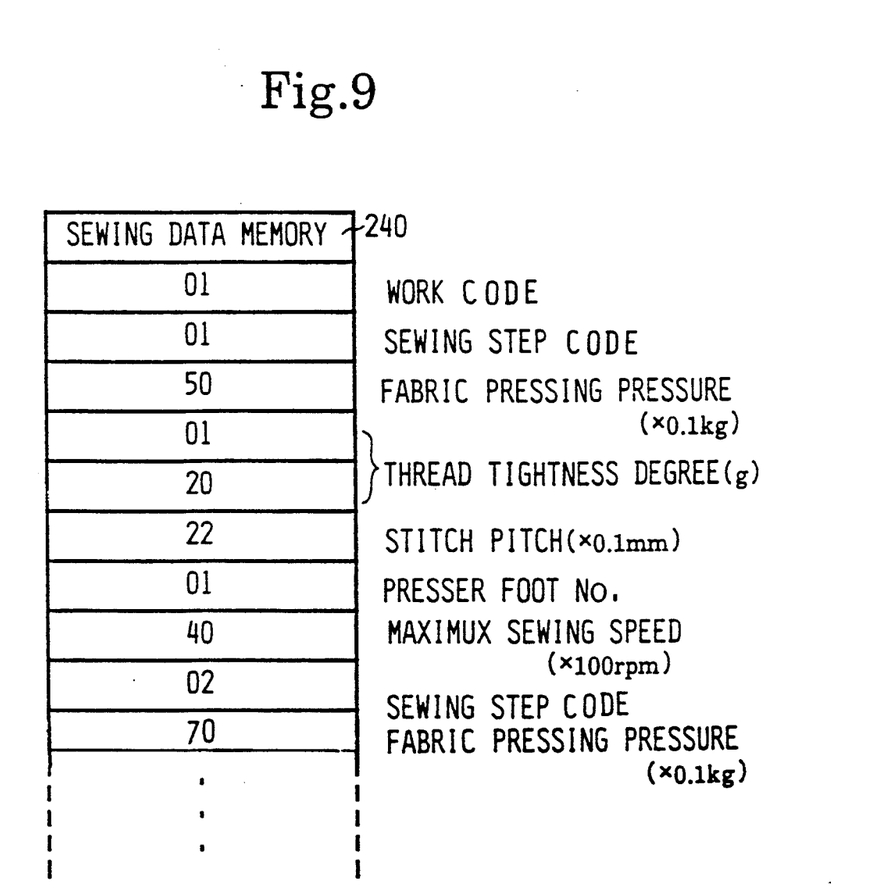
FIG. 9 is a diagrammatic representation illustrating contents of a sewing data memory of the RAM.

Referring back to FIG. 1A, the CPU 212 further has a sewing data storage device 250 connected thereto. The sewing data storage device 250 has stored therein, for each of identification codes by which types of works to be sewn, i.e., work codes, and sewing steps necessary for performing sewing of such works, i.e., sewing step codes, data necessary for performance of the sewing steps including a feed pitch, a type of a presser foot, a fabric pressing pressure, a thread tightness degree and a sewing speed (which are sewing conditions hereinafter referred to generally as sewing data) and a number of yarn cutting operations. Each of such identification codes is a combination of a work code of 2 bits representative of a work to be sewn and a sewing step code of 2 bits representative of a sewing step. Sewing data are stored for each identification code as seen in FIG. 9. It is to be noted that, while FIG. 9 illustrates a condition after data of the sewing data storage device 250 are transferred to the sewing data memory 240 of the RAM 216 as hereinafter described, data are stored in a similar manner also in the sewing data storage device 250.

Figure 1B:
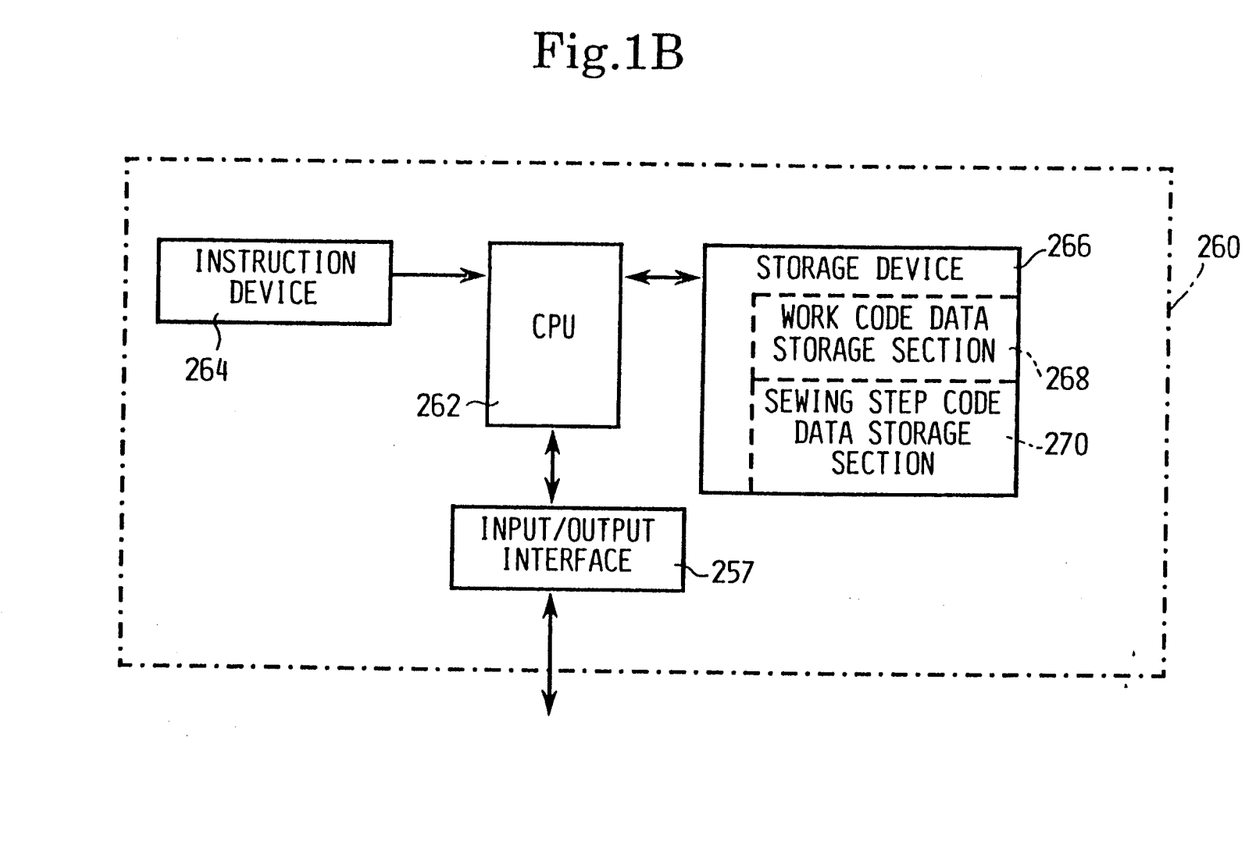
FIG. 1B is a detailed block diagram showing the managing apparatus.

Referring back to FIG. 1A and FIG. 1B, a CPU 262 of a microcomputer which comprises a main component of a managing apparatus 260 is connected to the CPU 212 by way of a pair of input/output interfaces 256 and 257. The managing apparatus 260 is provided for controlling a plurality of sewing machines each having such a controlling apparatus 210 as described above, and an instruction device 264 and a storage device 266 are connected to the CPU 262 thereof. The instruction device 264 includes an input section which is provided for inputting therethrough data necessary for sewing such as a type of a work to be sewn and a number of works to be sewn. Meanwhile, the storage device 266 has a work code data storage section 268 and a sewing step code data storage section 270. Work codes representative of such works (such codes are the same as work codes of the identification codes stored in the sewing data storage device 250) are stored in the work code data storage section 268 in a corresponding relationship with ordinary names of works to be sewn. On the other hand, sewing step codes representative of sewing steps necessary for the sewing of such works (such codes are the same as the sewing step codes of the identification codes stored in the sewing data storage device 250) are stored in a corresponding relationship with work codes representative of works in the sewing step code data storage section 270. Upon inputting of data by way of the instruction device 264, a type of a work is entered in its ordinary name, and after such data entry, a work code representative of the work is read out from the work code data storage section 268, and consequently, the type of the work is converted into the work code. Though not shown, the storage device 266 further includes a data storage section for storing input data therein, and a program storage section for storing therein a management program for controlling sewing operations of the sewing machines. Setting of sewing conditions will now be described with reference to the flow chart of FIG. 8.

If the power source for the sewing machines is switched on and signals representative of completion of preparation for starting of a sewing operation are transmitted from the sewing machines to the managing apparatus 260, the CPU 262 determines types of works to be sewn individually by the sewing machines in accordance with the management program and then supplies identification codes of the types of works to the sewing machines. Sewing step codes are then read out from the sewing step code data storage section 270 in accordance with the work codes representative of the types of works to be sewn by the sewing machines, and identification codes consisting of such two kinds of codes are supplied to the sewing machines. It is to be noted that, in the present embodiment, each sewing machine sews an entire work of a single type and all of the identification codes are output simultaneously to the sewing machines. Further, sewing order data are output together with such supply of identification codes and displayed on the display device 238.

Figure 8:
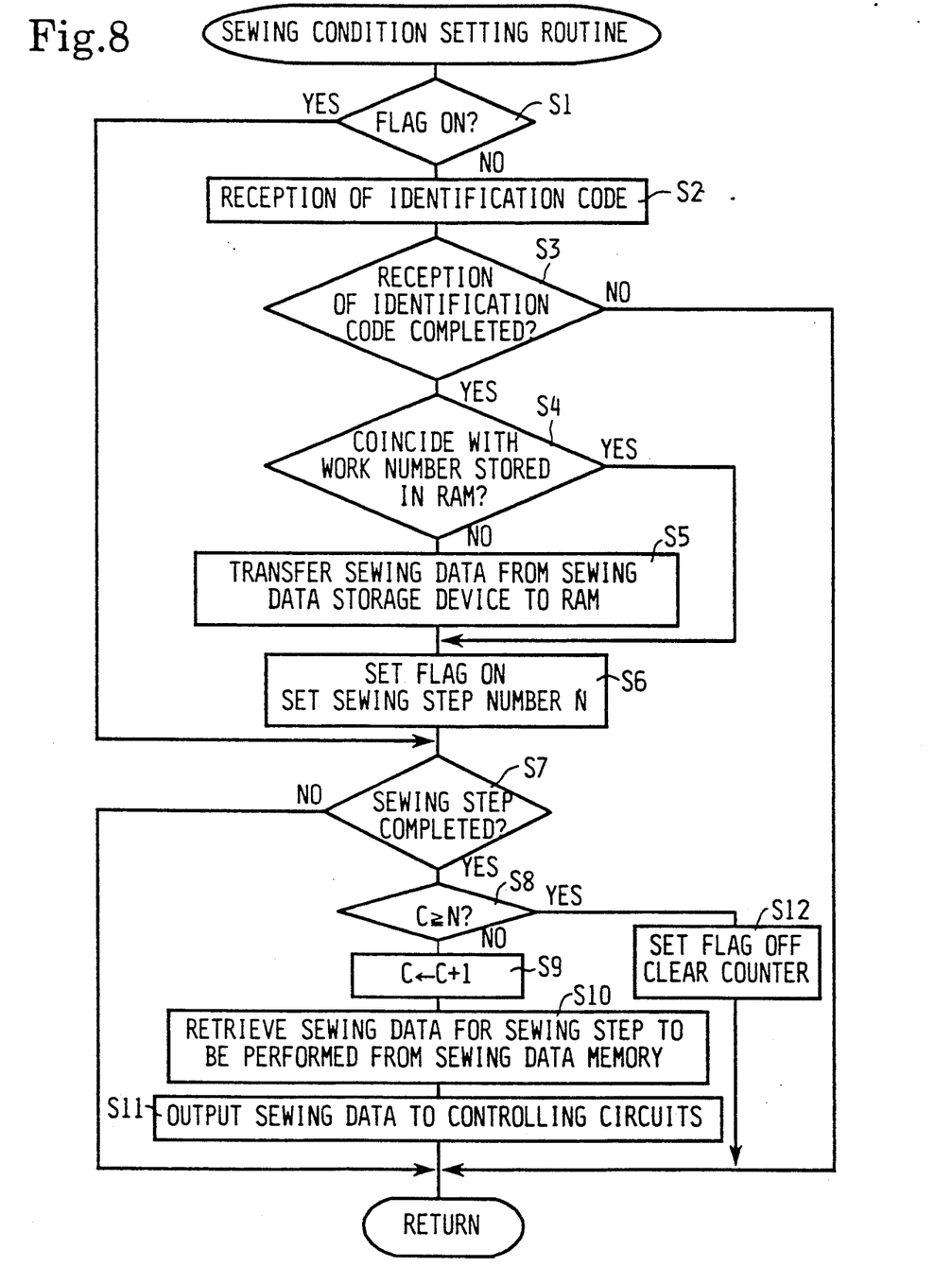
FIG. 8 is a flow chart illustrating a sewing condition setting routine stored in a ROM.

On each of the sewing machines, operations at steps S1 to S3 are executed successively to a wait reception of an identification code after the power source is made available. Since the flag 244 is placed into an OFF state at initializing step which is executed before the present routine of FIG. 8 is entered, the judgment here at step S1 is NO. Thus, at step S2, an identification code is received and stored into the identification code data memory 248. However, if no identification code is received, then no such storage is executed. In this case, at step S3, it is judged, depending upon whether end data are received or not, whether or not reception of an identification code has been completed. In this instance, the judgment is also NO here, and consequently, the jobs at steps S1 to S3 will be executed repetitively.

If an identification code is received, then it is stored into the identification code data memory 248 while a count value C of the counter 246 is initialized to set to "0" at step S2. If the judgment at step S3 changes to YES due to reception of end data, then it is judged at step S4 whether or not a work code contained in the received identification code coincides with a work code stored in the sewing data memory 240 of the RAM 216. If they do not coincide with each other, then this means that a precedent sewing operation is different in type from a sewing operation to be performed subsequently, and therefore, sewing data stored in the sewing data memory 240 cannot be used for the subsequent sewing operation. Thus, at step S5, the sewing data stored in the sewing data storage device 250 which are the same in identification code as the input identification code are transferred to the sewing data memory 240. Then, at step S6, the flag 244 is changed to an ON state and the total number N of sewing steps necessary to sew the work instructed by the construction device 264 is stored into the sewing step number member memory 242. When the work code contained in the received identification code coincides with a work code stored in the sewing data memory 240, the step S6 is executed, bypassing the step S5.

At step S7, it is judged whether or not a sewing step has completed. Completion of a sewing step is detected by detecting in the sewing step completion detecting routine mentioned hereinabove whether or not a thread cutting operation has been performed a predetermined number of times, and the judgment at step S7 is effected in accordance with a result of such detection. When a next sewing operation is to be started, completion of a previous sewing operation is detected and the judgment at step S7 yields YES. Thus, at step S8, it is judged whether or not the count value C reaches N to judge whether or not all of the necessary sewing steps have been performed. Here, the judgment is NO, and accordingly, the count value of the counter 246 is incremented by 1 at step S9. For example, the counter 246 is set to "0" in the initializing step mentioned hereinabove, and accordingly, the count value C of the counter 246 is incremented to C=1. At step S10, sewing data for a sewing step which is to be performed first are read out from the sewing data memory 240. At step S11, data representative of a feed pitch, a fabric pressing pressure, a thread tightness degree and a type of a presser foot are output to the controlling circuits 222, 228 and 232 and the driver circuit 226, respectively. Consequently, the feed pitch, the fabric pressing pressure and the thread tightness degree are adjusted to the thus set magnitudes while the presser foot of the set type is positioned in the operative position. The sewing speed is controlled to a predetermined speed in the sewing speed controlling routine mentioned hereinabove, rotation of the sewing machine main shaft being used for the feedback control in accordance with a result of detection of the rotation detector 24. The sewing speed data are stored into the sewing speed memory which is used in execution of the sewing speed controlling routine. It is to be noted that the sewing speed control is similar to that disclosed in the specification and drawings annexed to the application of Japanese Patent Application No. 2-119403. Further, at step S11, when the sewing data are output, a sewing data outputting signal is generated to begin the sewing step completion detecting routine. In the sewing step completion detecting routine, the number of thread cutting operations for the first sewing step may be set to attain a sewing step incompletion detection condition. Since sewing conditions are automatically set in accordance with sewing data in this manner, an operator need not adjust the feed pitch or exchange a presser foot and can thus proceed sewing rapidly in accordance with the instructed operation procedure.

When the step S1 is executed subsequently, the judgment yields YES, while the judgment at step S7 yields NO. Consequently, the steps S1 and S7 are executed repetitively until one sewing step is completed, and accordingly, the sewing conditions will not be changed. After one sewing step is completed, the judgment at step S7 changes to YES, and the job at step S8 is executed subsequently. Until a sewing step has been executed N times, the judgment at step S8 remains NO, and at step S9, the count value C of the counter 246 is incremented by one. Afterwards, at step S10, sewing data for a sewing step to be executed subsequently are retrieved, and sewing conditions are set to the magnitudes or types suitable for the subsequent sewing step. If execution of all of the instructed sewing steps is completed, then the judgment at step S8 changes to YES. Thus, at step S12, the flag 244 is changed to an OFF state and the counter 246 is cleared, thereby completing execution of the routine.

In this manner, in the sewing system for sewing machines of the present embodiment, since sewing conditions are automatically set to conditions suitable for particular sewing steps, the operation efficiency is improved in comparison with an alternative case wherein an operator sets such sewing conditions. In addition, uniform sewn works can be obtained.

Further, since a sewing step is indicated by an identification code, sewing data need not be stored for each sewing step as in an alternative case wherein the managing apparatus 260 supplies the sewing data to the sewing machines, and consequently, the capacity of the storage device of the managing apparatus 260 can be reduced. Particularly where each of the sewing machines is a dedicated sewing machine for performing only one kind or a small number of kinds of sewing operations, since the managing apparatus 260 manages a plurality of sewing machines, when sewing data are to be stored, the managing apparatus 260 must store therein data necessary for the sewing operations to be performed on all of the sewing machines. However, according to the sewing management system for sewing machines of the present invention, the sewing data storage device 250 of each sewing machine must only store therein sewing data for performing the dedicated sewing operation or operations, and accordingly, the storage capacity thereof can be minimized.

Meanwhile, various sewing machines differ in working and assembly, and even when the same step is to be performed for the same work on the sewing machines, some modification may be required to individual data for the sewing machines. Also in this instance, setting of data for the individual sewing machines can be performed readily because each of the sewing machines has sewing data therefor stored therein.

Since the managing apparatus 260 performs only designation of steps and detailed sewing data are provided in each of the sewing machines, such designation and setting of data to the sewing machines can be effected independently of each other. This signifies at least that a system designer can build a system even without familiarity of a sewing machine.

It is to be noted that, while a type of a work is input by way of a name thereof in the embodiment described hereinabove, the instructing device may alternatively have keys for the instruction of particular types of sewing works so that a type of a work may be input by selective operation of such keys.

Further, while five sewing conditions are varied depending upon a sewing step in the embodiment described above, some other sewing conditions may additionally be automatically set, or else only a portion of the five sewing conditions may be set.

Further, while execution of all of sewing steps is instructed simultaneously by way of an instruction of a work in the embodiment described hereinabove, such sewing steps may otherwise be instructed individually or for each plural number of sewing steps smaller than the number of all of the sewing steps.

Further, while an entire work of a single type is sewn on each sewing machine in the embodiment described hereinabove, the present invention can be applied to a sewing system wherein different sewing steps are assigned to a plurality of sewing machines so that a work may be sewn on the sewing machines by division of labor.

Having now fully described the invention, it will be apparent to one of ordinary skill in the art that many changes and modifications can be made thereto without departing from the spirit and scope of the invention as set forth in the following claims.

What is claimed is:

1. In a sewing management system which includes a plurality of sewing machines and a managing apparatus for managing sewing operations of said sewing machines, the improvement wherein:

said managing apparatus includes sewing step instructing means for providing instructions related to at least one of a plurality of sewing steps, code storage means for storing an identification code in corresponding relationship with at least one sewing step and identification code supplying means for supplying an identification code representative of said at least one sewing step according to the instructions from said sewing step instructing means to said sewing machines; and each of said sewing machines includes sewing data storage means for storing therein a plurality of sewing data necessary for execution of said at least one sewing step in a corresponding relationship with said identification code, and controlling means for reading out sewing data from said sewing data storage means, said sewing data being for the at least one sewing step represented by the identification code supplied from said identification code supplying means, said controlling means further controlling the sewing machine in accordance with the thus read sewing data.

2. A sewing management system according to claim 1, wherein said sewing step instructing means instructs a type of a work to be sewn on each of said sewing machines.

3. A sewing management system according to claim 2, wherein said code storage means stores work codes and sewing step codes and outputs the work codes and the sewing step codes in accordance with the instructions related to types of works to be sewn from said sewing step instructing means, and said identification code includes one work code and at least one sewing step code.

4. A sewing management system according to claim 1, wherein the identification code is a combination of a work code and a sewing step code, and said sewing data storage means has stored for each of such identification codes therein sewing data related to at least one of a feed pitch, a type of a presser foot, a fabric pressing pressure, a thread tightness degree and a sewing speed.

5. A sewing management system having a managing apparatus communicating with a plurality of sewing machines, comprising:

sewing step instructing means provided in the managing apparatus for providing instructions related to at least one of a plurality of sewing steps;

code storage means provided in the managing apparatus for storing an identification code in corresponding relationship with at least one sewing step;

identification code supplying means provided in the managing apparatus for supplying an identification code representative of said at least one sewing step according to the instructions from said sewing step instructing means to said sewing machines;

sewing data storage means provided in each of the plurality of sewing machines for storing therein a plurality of sewing data necessary for the execution of said at least one sewing step in a corresponding relationship to said identification code; and controlling means provided in each of the plurality of sewing machines for reading from said sewing data storage means sewing data for the at least one sewing step represented by the identification code supplied from said identification code supplying means, said controlling means further controlling a sewing operation of the sewing machine in accordance with the thus read sewing data.

6. The sewing management system according to claim 5, wherein said sewing step instructing means instructs a type of a work to be sewn on each of said sewing machines.

7. The sewing management according to claim 6, wherein said code storage means stores work codes and sewing step codes and outputs the work codes and the sewing step codes in accordance with the instructions related to types of works to be sewn from said sewing step instructing means, and said identification code includes one work code and at least one sewing step code.

8. The sewing management system according to claim 2, wherein the identification code is a combination of a work code and a sewing step code, and said sewing data storage means has stored for each of such identification codes therein sewing data related to at least one of a feed pitch, a type of a presser foot, a fabric pressing pressure, a thread tightness degree and a sewing speed.

9. A sewing management system for managing sewing operations of plural sewing machines, comprising:

a managing apparatus having code storage means for storing plural codes related to sewing operations to be performed to sew plural different types of works with the plural sewing machines, instruction means for instructing a desired work among the plural different types of works to said code storage means, and code outputting means for extracting from the code storage means the code related to at least one of said sewing operations to be performed to sew the work instructed by the instruction means and for outputting the extracted code from the managing apparatus; and plural controlling apparatuses each provided corresponding to each of the plural sewing machines, each of the plural controlling apparatuses having code receiving means for receiving the code from the code outputting means, sewing data storage means for storing plural sewing data necessary for at least one of said sewing operations to be performed to sew each of the plural different types of works, and controlling means for reading out sewing data from the sewing data storage means according to the code received by the code receiving means and for controlling a sewing operation of the corresponding sewing machine based on the read sewing data.

10. A sewing management system according to claim 9, wherein the code storage means stores plural work codes representative of the plural different types of works and plural sewing step codes representative of plural sewing steps necessary for sewing each of the plural different types of works, and the code outputting means extracts from the code storage means an identification code comprising a combination of the work code representative of the work instructed by the instruction means and the plural sewing step codes representative of plural sewing steps necessary to sew the instructed work.

11. A sewing management system according to claim 10, wherein the controlling means reads out from the sewing data storage means plural sewing data to be used for the plural sewing steps necessary to sew the instructed work according to the identification code corresponding to the instructed work.

12. A sewing management system according to claim 10, further comprising temporary storage means for temporarily storing the sewing step code and the plural sewing data read out from said sewing data storage means in a manner that the plural sewing data correspond to the sewing step code representative of each of plural sewing steps necessary to sew the work instructed by said instruction means.

13. A sewing management system according to claim 9, wherein said sewing data storage means stores plural sewing data which are provided for controlling conditions of plural setting devices disposed in each of the plural sewing machines.

14. A sewing management system according to claim 13, wherein the plural sewing data stored in said sewing data storage means are related to a feed pitch, a type of a pressure foot, a fabric pressing pressure, a thread tightness degree and a sewing speed.

15. A sewing management system according to claim 9, wherein said instruction means instructs a work name specifying a type of a work to said code storage means.

* * * * *